3,117,011
QUICK TEMPERING OF SHORTENINGS

Charles W. Hoerr and Robert J. Vander Wal, Chicago, Ill., assignors to Armour and Company, Chicago, Ill., a corporation of Delaware
No Drawing. Filed Mar. 17, 1961, Ser. No. 96,403
4 Claims. (Cl. 99—118)

This invention relates to the treatment of shortening triglycerides to impart improved characteristics with respect to plasticity, creaming volume, and uniformity of product. More particularly, the invention relates to process improvements enabling the production of superior shortening preparations in a substantially shorter period of time than has heretofore been possible.

The preferred shortenings of today are those which reach the consumer in the form of a somewhat soft plastic solid; and since the fats which go into shortenings vary greatly in consistency with changes in temperature, a problem which continually faces shortening producers is that of providing the consumer with shortening which is within the desired "plastic range" in spite of having passed through the rather substantial variations in temperature which are inevitable in the handling and storage of the products between the time they leave the producer and reach the consumer.

The existing method employed by the industry in meeting the above problem makes use of the fact that shortening triglycerides, which are crystallized from the molten state and then stored or "tempered" at 75–85° F. for 24 hours or more, tend to have a desired consistency or plasticity at use temperatures, in spite of having passed through any of the normally encountered vicissitudes of temperature. The tempering for a minimum period of time within the above temperature range is considered essential.

Thus, it is common practice in the industry to make up the desired triglyceride mixture in melted form and then supercool it rapidly from the molten state to below the solidifying point of the fat. This is done conventionally in an apparatus known as a Votator, according to the process which is described in detail on pages 921 to 924 of A. E. Bailey's book "Industrial Oil and Fat Products," 2nd Ed. (Interscience Publishers, Inc., New York, 1951). In the Votator unit, the melted fat is pumped through a series of externally chilled tubes which are provided with internal rotating blades which remove the thin film of chilled material from the walls of the tubes. After this, the supercooled fat is passed to another series of tubes (called "B" units) where the process of solidification or crystallization is continued under moderate agitation caused by beaters within the tubes. This is followed by packaging and then tempering for a prolonged period, as described above.

In the above procedure, the liquefied shortening triglycerides are first subjected to supercooling conditions resulting in partial crystallization and are then passed to the "B" unit of the Votator, where further crystallization takes place until the point of maximum crystallization has been reached. Following the point at which maximum crystallization has been achieved, and particularly during the tempering step which follows, certain changes take place. It appears that a process of crystal melting and recrystallization begins and continues along with the establishment of certain cohesive forces between the crystals. Beyond this, however, it seems certain that a specific kind of polymorphic transformation is effected. Thus, using the nomenclature recommended by Ferguson and Lutton, J.A.C.S., 67, 524 (1945), it appears that rapid chilling of the liquefied shortening triglycerides initially produces crystals in the alpha form. Since the alpha crystalline form is of a rather transitory nature, it appears further that a substantial portion of the triglyceride mass has changed to the beta prime crystalline form by the time the point of maximum crystallization has been achieved, and that the prolonged tempering step which follows is marked by a slow completion of the transformation to the normal polymorphic crystalline state, depending upon the particular type of shortening involved.

The shortening industry has heretofore regarded the prolonged tempering step as an essential element, without which it would be impossible to produce a shortening meeting the desired standards of consistency, creaming volume, and resistance to subsequent changes in ambient temperatures. Although the exact reasons for the effectiveness of the tempering step have not been well defined, it has been assumed in the trade that it is necessary to hold the shortening for a prolonged period of time in order to allow the desired changes to take place in an orderly fashion. Consequently, shortening plants are usually provided with special tempering rooms, in which all newly filled products are held for a period of about 48 hours at about 85° F. before they are shipped.

It is an object of the present invention to provide an improved and effectively simple method of treating shortening triglycerides, whereby the prolonged tempering step and the need for special tempering rooms are eliminated. It is a further object to impart to the finished shortening improved characteristics with respect to appearance and uniformity. Other objects of the invention will become apparent as the specification proceeds.

The present invention comprises the steps of cooling a mass of melted triglycerides from a molten state to effect crystallization and then uniformly heating the triglycerides under substantially quiescent conditions to the temperature at which transformation to the normal polymorphic crystalline state is rapidly completed.

An important feature of the invention is based on the discovery that each individual crystal in a newly crystallized mass of shortening may be brought almost instantaneously to its desired final form merely by heating and without the need for a prolonged tempering period; and that, when this is applied to a large mass of triglyceride crystals, the tempering step may be eliminated providing the heating is carried out under conditions such that the temperature of all the individual crystals is uniformly raised to the desired point, and providing the triglycerides are not unduly agitated during the heating or subsequent step to carry the crystal transformation beyond the normal polymorphic crystalline state or disrupt the overall crystal structure. As will be referred to hereinafter in more detail, one method of maintaining quiescence and uniformity of temperature during the heating step involves spreading the triglyceride in a thin layer, so that the individual crystals are in thermal equilibrium with each other as the temperature is being elevated; while yet another method of maintaining the quiescence and uniformity involves raising the temperature of the crystallized mass by use of dielectric heating means.

Without limiting the invention to any particular theory or mechanism, it appears that the heating of the triglycerides in a uniform manner and under relatively quiescent conditions brings about transformation of the crystals to the normal polymorphic crystalline state within a matter of only a few minutes and that, in this particular sequence of steps, the rapid conversion to the normal state is all that is required to produce the shortening characteristics which are desired. For the purpose of this specification and claims, it will be understood that the term "normal polymorphic crystalline state" refers to the crystalline state of a particular shortening which would be reached in that shortening by the conventional tempering procedure—i.e. holding at 75–85° F. for 24 hours or more. It should be understood that in most shortenings the normal polymorphic crystalline state is not the beta, or highest melting, most stable, crystalline form. Using, again, the nomenclature of Ferguson and Lutton, supra, who describe the progress of crystallization as proceeding from the alpha (or lowest melting) form through the beta (or highest melting) form, the explanation of the present prime form and eventually to the beta invention is based partially on the fact that not all shortenings are in the beta or highest melting form after the conventional tempering period. Some shortenings (e.g. certain types of lard and partially hydrogenated soybean oil) are in the beta prime crystalline form after the conventional tempering period, and can be brought to the beta form only by the use of unusual treatment, such as violent agitation. Thus, for these particular shortenings, the beta prime is the normal polymorphic crystalline state, and the use of unusual treatment, such as violent agitation during the later stages of the crystal transformation procedure, is apt to drive the crystal state beyond the desired beta prime form and therefore is apt to produce a shortening having undesirable properties. Other shortenings (e.g. rearranged lard, tallow, and partially hydrogenated soybean and cottonseed oil shortenings) are also in the beta prime crystalline form after the conventional tempering period but may be driven, by violent agitation procedure, to a crystalline form intermediate between the beta prime and beta form. Here again, the beta prime form is the normal polymorphic crystalline state for these particular shortenings, and if conditions are employed which cause the transformation to proceed beyond this stage, undesirable properties are apt to result. For still other shortenings (e.g. certain types of lard), the normal polymorphic crystalline state is the polymorphic form intermediate between the beta prime and beta forms, and these shortenings are rather easily caused to proceed beyond the normal intermediate stage by the use of agitation.

It has been found that the particular sequence of steps is important in obtaining the improved results of the present invention. Thus, it is necessary to start with liquefied triglycerides, then to cool to the point where crystals (presumably in the alpha form) begin to appear, and then when substantial crystallization has occurred, to heat the triglycerides uniformly and under substantially quiescent conditions. For most practical purposes, the heating may be started at the point where the triglycerides are discharged from the "B" unit of the Votator machine. Although the triglycerides are initially chilled in the Votator to temperatures of about 60 to 65° F., and although no heat is ordinarily applied in the "B" units, the heat of crystallization raises the temperature of the fats such that they issue from the "B" units usually in the neighborhood of 75–85° F. Ordinarily, the triglycerides at this stage have reached their point of maximum crystallization, since the succeeding stages of the process are characterized more by the transformation of the crystals rather than any substantial net gain in the number of crystals present. For the purposes of this specification and claims, it will be understood that the term "maximum crystallization" refers to the greatest degree of crystallization encountered during this particular sequence of steps and does not necessarily mean the maximum crystallization of which the triglyceride is capable. It is of course possible by extreme cooling of a triglyceride to effect such a great degree of crystallization that a hard, brittle solid is formed. However, these conditions are not ordinarily encountered in the treatment of shortening triglycerides to improve their plastic properties, and, as previously indicated, the term "maximum crystallization" as used herein refers to the greatest degree of crystallization occurring during the sequence of steps employed in the treatment of shortening to improve its plastic properties.

During the heating step of the present invention, it is essential that a uniform temperature be maintained throughout the heated triglycerides and that zones of thermal inequality be essentially avoided. At the same time, it is essential that, at least during the later states of crystal transformation, the triglycerides no be subjected to any substantial agitation which would carry the polymorphic crystal transformation beyond the normal state or disrupt the overall crystal structure. The degree of agitation which can be endured by the triglycerides without adverse effect depends to some extent on the type of fat involved and also on the past preparative history of the product. However, it may be observed generally that the mild jostling involved in transporting the product from the producer to consumer does not ordinarily constitute agitation in sufficient amount to affect the product adversely. Also, the measure of mixing or agitating which might be involved in passing the shortening under pressure through the conventional filling nozzle has been found not to have a substantial adverse effect. Agitation more violent than this—e.g., the violent whipping or chopping action which is involved in the operation of some types of impeller pumps or in the Votator—is the type of treatment which cannot be endured in the heating or subsequent steps of the process of the present invention. The term "under substantially quiescent conditions," as used in this specification and claims, therefore, is not intended to exclude the mild jostling involved in shipping, the turbulence involved in extruding the product under pressure through the conventional filling nozzle, and other treatments of like effect.

One means of accomplishing the heating of the present invention under conditions of quiescence and uniformity of temperature involves spreading the triglycerides in a relatively thin layer in an atmosphere of elevated temperature. The spreading of the triglycerides in a thin layer may be accomplished in any suitable way, such for example as by taking them up on a revolving drum or simply by doctoring or spreading them on trays of appropriate size. The thickness of the layer may vary from about 1 inch down to the lowest thickness which can be obtained from the practical standpoint. In other words, it is possible to achieve the objects of the present invention regardless of how thin the layer is and it is only practical considerations which prevent the use of extremely thin layers. On the other hand, it has been found that layers which are greater than ½ to 1 inch in thickness begin to shown less effectiveness in obtaining the results of the invention. Layers approximately ¼ inch in thickness have been found most satisfactory.

Another means of accomplishing the uniform heating while avoiding undue agitation involves the use of dielectric heating means, according to the process set forth in greater detail in Examples V to IX below.

The temperature to which the triglycerides must be brought during the heating step is that at which transformation to the normal polymorphic crystalline state is rapidly completed. This particular temperature must be determined for each kind or grade of triglyceride. In some cases we have made the process work successfully at 88° F., but usually the temperature should be brought above 90° F. before termination of the heating. It will be understood that triglycerides which are in the alpha crystal form will undergo some transformation to the normal polymorphic state even at temperatures substantially lower than 88 or 90° F. However, such transformation is an erratic procedure which may or may not be completed after several days of holding. The present invention contemplates raising the temperature rapidly to the point where conversion to the normal form is substantially completed within a matter of minutes or a few hours. It is essential, however, to avoid carrying the temperature above the point at which any substantial melting of the normal crystals occurs. Here again the particular temperatures must be determined for the individual triglycerides, but generally it is not desirable to go above a temperature in the neighborhood of 110° F. The invention therefore involves terminating the heating at a temperature at least high enough to effect rapid completion of the transformation to the normal polymorphic crystalline state but below the temperature at which any substantial melting of the normal form of the crystal takes place.

The invention is useful in connection with shortening triglycerides generally. For the purposes of the present specification, the term "shortening" is used to include the various forms of lard, such as ordinary lard, hydrogenated lard, deodorized lard, rearranged lard, etc., and also to include the other types of shortening materials such as rendered pork fat, plastic oleo oil, hydrogenated vegetable oil, animal and vegetable fat shortening compounds, all-vegetable fat shortening compounds, or various mixtures of the above. The animal fats used to make up the animal and vegetable fat shortening compounds may be oleostearine, lard, tallow, and the like, while the vegetable fats may be cottonseed oil, soybean oil, palm oil, peanut oil, coconut oil, or mixtures thereof.

It has been found that, by the practice of the present invention, the prolonged tempering step heretofore thought necessary by the trade can be eliminated and replaced by an effectively simple heating step which requires only a matter of minutes, as contrasted with the 24, 48, or more hours ordinarily consumed in the tempering process. Depending, of course, on the amount of shortening to be treated, and on other conditions, the heating step of the present invention can usually be accomplished in well under one hour. If desired, the heating may be carried out over a longer period of time, although it will be seen that certain advantages may be lost by extending the heating for a period longer than 5 or 6 hours. In addition to eliminating the prolonged tempering step and the need for special tempering rooms, the practice of the invention has been found to provide a shortening which is substantially improved from the standpoint of uniformity and appearance.

In the following examples, which are illustrative of the invention, the effectiveness of the shortened tempering step is measured in terms of pound cake volume. The standard procedure used in determining pound cake volume involves the use of the shortening under test in baking a cake of the following formula:

1 pound fine granulated sugar
8 ounces shortening
½ ounce salt
8 ounces eggs
8 ounces milk
1 pound fine cake flour The conditions of mixing and baking are in each case identical. The volume of the cake in milliliters divided by its weight in grams, multiplied by 100, gives a figure which is representative of the cake volume-producing characteristics of the shortening being tested. The cakes baked according to this standard procedure are modified pound cake, and hereinafter we shall refer to the number arrived at according to the method above explained as the "pound cake volume" of the shortening used in the test.

The minimum pound cake volume of a properly tempered, high grade shortening is about 250. The pound cake volume of such a shortening, which has not been tempered, is in the neighborhood of 200–220.

EXAMPLE I

The shortening utilized in this example was a shortening made from 100% pure vegetable oils, which had been refined, bleached, and then hydrogenated. In a regular commercial operation, such shortening, in melted form after the hydrogenation step, was pumped through a Votator unit, wherein the fat was rapidly chilled, and then through the "B" units of the Votator where the process of crystallization was completed under moderate agitation caused by beaters within the tubes.

A quantity of such shortening was taken from the "B" units of the Votator at 80° F. and divided into five portions, Lots A, B, C, D, and E.

Lot A was used immediately in the preparation of a pound cake. The pound cake volume was 219.

Lot B was immediately spread on trays in layers ¼ inch thick and placed in a 90° F. room for two hours and then immediately used in baking a pound cake. The pound cake volume was 270.

Lot C was immediately spread on trays in layers ¼ inch thick and placed in a 90° F. room for two hours, then held in a 75° F. room for 20 hours, and finally used to bake a pound cake. The pound cake volume was 270.

Lot D was immediately spread on trays in layers ¼ inch thick and placed in a 90° F. room for three hours and then immediately used in baking a pound cake. The pound cake volume was 270.

Lot E was immediately spread on trays in layers ¼ inch thick and placed in a 90° F. room for three hours, then held in a 75° F. room for 20 hours, and finally used in the preparation of a pound cake. The pound cake volume was 270.

The remainder of the bulk of the commercial run, from which Lots A, B, C, D, and E were taken, was removed from the "B" units of the Votator and run through the conventional plant tempering procedure, involving a holding period of 48 hours at 85° F. The pound cake volume of such product was 270.

The foregoing results are summarized in Table I below. It will be seen that, by spreading the shortening out on trays and holding for two hours at 90° F., the conventional 48 hour tempering step can be eliminated without any loss of the shortening properties of the product.

*Table I*

| Lot | Temp. out of "B" Unit, ° F. | Treatment | Time in 90° F. Room, hrs. | Time in 75° F. Room, hrs. | Pound Cake Volume |
|---|---|---|---|---|---|
| A | 80 | As is | | | 219 |
| B | 80 | Spread ¼" thick | 2 | | 270 |
| C | 80 | ----do---- | 2 | 20 | 270 |
| D | 80 | ----do---- | 3 | | 270 |
| E | 80 | ----do---- | 3 | 20 | 270 |
| Bulk | 80 | Filled in containers | 48 | 20 | 270 |

EXAMPLE II

The same procedure outlined in Example I was used for the present example, except that Lots B and C (spread in layers ¼ inch thick) were held in the 90° F. room for 20 minutes instead of two hours. The results are set forth in Table II below.

*Table II*

| Lot | Temp. out of "B" Unit, ° F. | Treatment | Time in 90° F. Room | Time in 75° F. Room, hrs. | Pound Cake Volume |
|---|---|---|---|---|---|
| A | 80 | As is | | | 229 |
| B | 80 | Spread ¼" thick | 20 min | | 260 |
| C | 80 | ----do---- | 20 min | 20 | 270 |
| D | 80 | ----do---- | 3 hrs | | 273 |
| E | 80 | ----do---- | 3 hrs | 20 | 280 |
| Bulk | 80 | Filled in containers | 48 hrs | 20 | 275 |

It will be seen that by holding Lot B, spread in thin layers, for only 20 minutes at the appropriate temperature, a shortening product having a satisfactory pound cake volume was obtained.

EXAMPLE III

The same procedure outlined in Example II was used for the present Example III. The results are set forth in Table III below:

*Table III*

| Lot | Temp. out of "B" Unit, °F. | Treatment | Time in 90° F. Room | Time in 75° F. Room, hrs. | Pound Cake Volume |
|---|---|---|---|---|---|
| A | 80 | As is | | | 220 |
| B | 80 | Spread ¼" thick | 20 min | | 264 |
| C | 80 | ____do____ | 20 min | 20 | 268 |
| D | 80 | ____do____ | 3 hrs | | 270 |
| E | 80 | ____do____ | 3 hrs | 20 | 279 |
| Bulk | 80 | Filled in containers | 48 hrs | 20 | 270 |

EXAMPLE IV

The same general procedure outlined in Example I was used for the present Example IV, except that Lot E, after holding in thin layers in the 90° F. room for three hours, was then held for 20 hours at 40° F. before making the pound cake test. The results are set forth in Table IV below:

*Table IV*

| Lot | Temp. out of "B" Unit, °F. | Treatment | Time in 90° F. Room, hrs. | Time in 75° F. Room, hrs. | Pound Cake Volume |
|---|---|---|---|---|---|
| A | 82 | As is | | | 209 |
| B | 82 | Spread ¼" thick | 3 | | 260 |
| C | 82 | ____do____ | 3 | 20 | 258 |
| D | 82 | ____do____ | 3 | | 260 |
| E | 82 | ____do____ | 3 | ¹ 20 | 258 |
| Bulk | 82 | Filled in containers | 48 | 20 | 258 |

¹ At 40° F.

It will be seen that, once the stable crystal form had been attained by holding for three hours at 90° F., the desirable shortening properties, as measured by pound cake volumes, were retained even in spite of subsequent treatment such as subjecting the fat to 40° F. temperatures for 20 hours (see Lot E above).

EXAMPLE V

The shortening utilized in this example was a shortening made from a blend of rearranged lard and other meat fats, refined and bleached. In a regular commercial operation, such shortening, in melted form, was pumped through a Votator unit, wherein the fat was rapidly chilled, and then through the "B" units of the Votator where the process of crystallization was completed under moderate agitation caused by beaters within the tubes. The temperature of the shortening issuing from the "B" units was 84° F.

A quantity of such shortening taken from the "B" units was separated into three lots—Lots A, B and C.

Lot A was used immediately in the preparation of a pound cake. The pound cake volume was 216.

Lot B was run through the regular plant tempering procedure, involving a holding period of 48 hours at 85° F. The pound cake volume of such product was 259.

Lot C was taken directly from the "B" units at 84° F. and uniformly and quickly heated to 93° F. in a dielectric heating unit, as described below, and then immediately used in baking a pound cake. The pound cake volume was 260.

The dielectric heating referred to in connection with Lot C above was carried out in a unit designed to apply high frequency electrical energy to dielectric materials to elevate their temperature uniformly and without thermal inequalities throughout the mass. The unit, referred to as a Thermex, incorporates a plate and grid as electrodes and is equipped with a sliding drawer for admission of the product to be treated. The operating conditions, as applied to Lot C above, were as follows:

| | | |
|---|---|---|
| Heating time | sec | 13 |
| Grid current | ma | 235 |
| Frequency | mc | 27.32 |
| Electrode height | inches | 4 |
| Temperature before | °F | 84 |
| Temperature after | °F | 83 |

EXAMPLE VI

A shortening made from a blend of partially hydrogenated soybean and cottonseed oil, which had been refined and bleached, was treated according to the general procedure outlined in Example V.

A quantity of the shortening issuing from the "B" units of the Votator at 83° F. was separated into four lots—Lots A, B, C and D.

Lot A was used immediately in the preparation of a pound cake. The pound cake volume was 240.

Lot B was run through the regular plant tempering procedure, involving a holding period of 48 hours at 85° F. The pound cake volume of such product was 260.

Lot C was taken directly from the "B" units at 83° F. and uniformly and quickly heated to 93° F. in the dielectric heating unit described in Example V, and then immediately used in baking a pound cake. The pound cake volume was 260.

Lot D was treated the same as Lot C, except the material issuing from the dielectric heater was subjected to the action of 40 strokes in a grease-worker and then immediately used in baking a pound cake. The pound cake volume was 240, thus illustrating the adverse effect of mechanical agitation during or after the later stages of normal crystal transformation.

EXAMPLE VII

The dielectric heating unit used in the heating step of this Example was a Thermex Unit of the same type as described in Example V, except that it was fitted for continuous operation with a plastic tube through which the product flowed while undergoing the dielectric heating. The dielectric heating unit thus consisted of a 7 foot 4 inch plastic tube, with a 2 inch inside diameter, having two electrodes 4 inches wide and 30 inches long on each side of the tube. Shortening was pumped from the "B" units directly through the tube and heated by a 7.5 kw. dielectric generator operating at a frequency of 27.32 mc.

The shortening utilized in this example was a shortening made from a blend of partially hydrogenated soybean and cottonseed oil, which had been refined and bleached, and which had the following characteristics:

| | | |
|---|---|---|
| Free fatty acids | percent | 0.04 |
| Color (Y-R) | | 15/1.8 |
| Congeal point (°C.) | | 35.1 |
| ASTM penetration: | | |
| 70° F | | 174 |
| 98° F | | 279 |

A quantity of such shortening was taken from the "B" units at a temperature of 80° F. and separated into three lots—Lots A, B and C.

Lot A was used immediately in the preparation of a pound cake. The pound cake volume was 240.

Lot B was run through the regular plant tempering procedure, involving a holding period of 48 hours at 85° F. The pound cake volume of such product was 276.

Lot C was taken directly from the "B" units at 80° F. and uniformly and quickly heated to 92° F. in the continuous dielectric unit described above, and then immediately used in baking a pound cake. The pound cake volume was 276.

EXAMPLE VIII

The type of shortening and the dielectric heating unit used in this example were the same as in Example VII, but the shortening was taken from the "B" units at a somewhat lower temperature and heated in the dielectric heating unit to a somewhat higher temperature than in Example VII.

Thus, the material was taken from the "B" units at 78° F. and dielectrically heated to 94° F., and the immediate pound cake volume was 263, as compared with a pound cake volume of 210 for the non-tempered materials.

EXAMPLE IX

The dielectric heating unit used in the heating step of this example was a Thermex Unit similar to the one described in Example VII. The shortening used in this example was a blend containing 40% tallow, 47% rearranged lard, 8% partially hydrogenated soybean oil, and 5% tallow flakes, and which had the following characteristics:

Free fatty acids_____percent__ 0.03
Color (Y-R)_____ 5/1.0
ASTM penetration:
   70° F_____ 166
   98° F_____ 231

A quantity of such shortening was taken from the "B" units at a temperature of 86° F. and separated into three lots—Lots A, B and C.

Lot A was used immediately in the preparation of a pound cake. The pound cake volume was 206.

Lot B was run through the regular plant tempering procedure, involving a holding period of 48 hours at 85° F. The pound cake volume of such product was 265.

Lot C was taken directly from the "B" units at 86° F. and run through the Thermex unit at a rate of 6,000 pounds per hour. The Thermex unit was equipped, at the discharge end, with a filling nozzle and was operated under a back pressure of 200 pounds. The shortening issuing from the Thermex had a temperature of 94° F. and, when used immediately in baking a pound cake, produced a pound cake volume of 266.

While in the foregoing specification certain specific steps have been set forth in considerable detail for the purpose of illustrating the invention, it will be understood that such details may be varied widely by those skilled in the art without departing from the spirit of the invention.

We claim:
1. A process for treating shortening triglycerides to improve their physical properties comprising the steps of cooling a mass of melted triglycerides from a molten state to effect crystallization and then uniformly heating said triglycerides under substantially quiescent conditions to a temperature within the range of about 90 to 110° F. and maintaining the triglycerides at said temperature for a period no greater than 6 hours.

2. A process for treating shortening triglycerides to improve their physical properties comprising the steps of cooling a mass of melted triglycerides from a molten state to effect crystallization and then heating said triglycerides, while maintaining them in a thin layer, no greater than 1 inch in thickness to a temperature within the range of about 90 to 110° F. and maintaining the triglycerides at said temperature for a period no greater than 6 hours.

3. A process for treating shortening triglycerides to improve their physical properties comprising the steps of cooling a mass of melted triglycerides from a molten state to effect crystallization and then, after the point of maximum crystallization has been reached, uniformly heating said triglycerides under substantially quiescent conditions to a temperature within the range of about 90 to 110° F. and maintaining the triglycerides at said temperature for a period no greater than 6 hours.

4. In a process for treating shortening triglycerides to improve their physical characteristics, wherein a mass of melted triglycerides is cooled from a molten state to effect crystallization and then further treated to cause transformation to the normal polymorphic crystalline state, the step of uniformly heating the newly crystallized triglycerides to a temperature within the range of about 90 to 110° F. for a period not greater than 6 hours and maintaining the triglycerides under substantially quiescent conditions during the later stages of crystal transformation.

References Cited in the file of this patent
UNITED STATES PATENTS

| | | |
|---|---|---|
| 2,521,219 | Holman et al. | Sept. 5, 1950 |
| 2,815,285 | Holman et al. | Dec. 3, 1957 |